United States Patent
Saffir

[15] 3,663,099
[45] May 16, 1972

[54] EYEGLASS FRAME WITH CAVITIES FOR STORING CONTACT LENSES

[72] Inventor: Jacob A. Saffir, Los Angeles, Calif.
[73] Assignee: Dentsply International Inc., York, Pa.
[22] Filed: June 12, 1970
[21] Appl. No.: 45,650

[52] U.S. Cl..................................351/158, 351/111
[51] Int. Cl.................................................G02c 1/00
[58] Field of Search..................351/158, 111, 47, 48, 57, 58

[56] References Cited

UNITED STATES PATENTS

| 2,721,498 | 10/1955 | Gerson | 351/111 X |
|---|---|---|---|
| 2,737,847 | 3/1956 | Tesauro | 351/57 |
| 3,247,330 | 4/1966 | Hinman | 351/158 X |

*Primary Examiner*—David Schonberg
*Assistant Examiner*—Robert L. Sherman
*Attorney*—C. Hercus Just

[57] ABSTRACT

This invention pertains to several embodiments of an eyeglass frame having means to support conventional ophthalmic lenses and, in addition, having compartment means adapted to retain contact lenses for the wearer, which are to be substituted periodically for the conventional ophthalmic lenses.

7 Claims, 16 Drawing Figures

PATENTED MAY 16 1972

INVENTOR.
JACOB A. SAFFIR
BY
ATTORNEY

PATENTED MAY 16 1972 3,663,099

INVENTOR.
JACOB A. SAFFIR
BY
ATTORNEY

EYEGLASS FRAME WITH CAVITIES FOR STORING CONTACT LENSES

BACKGROUND OF THE INVENTION

In recent years, contact lenses have become quite popular, especially for aesthetic purposes, as well as convenience. Many performing artists, athletes and prominent people do not care to appear in public wearing conventional eyeglasses or spectacles having a convention frame in which normal ophthalmic lenses are mounted. Vanity as well as convenience, and the lack of annoyance, undoubtedly inspire such attitudes. Conventional people not in the public eye also aspire to wearing contact lenses both for convenience as well as aesthetic purposes, the aesthetic purposes also no doubt largely being inspired by vanity. Aside from the actual reasons for persons adopting contact lenses, the fact remains that they now are worn by large numbers of individuals, either in lieu of or as a substitute for normal eyeglasses, or as an alternative, comprising a conventional frame in which the normal type of ophthalmic lenses are mounted.

It also is known that many persons who aspire to wearing contact lenses find that they cause irritation which results in the development of tears. It is not uncommon for this condition to become temporarily acute to such extent that the wearer has to remove the contact lenses at least for a period of rest, until the irritation of the eyeballs subsides. Meanwhile, normal eyeglasses or spectacles of the correct prescription for the individual wearer are worn, Under the conditions referred to above, it not only is essential to invest in a normal pair of eyeglasses which, when not in use, are carried in suitable case, and in addition, at least one and usually a pair of contact lenses are required and a special case must be provided for these. The special case for contact lenses is necessary because, under normal conditions, the lenses have different refractory powers, respectively prescribed for each of the wearer's eyes, whereby the left lens is different from the right lens and such designation must be maintained in the case or container within which the lenses normally are stored when not in use. Further, the case or container normally preserves the contact lenses in moist condition by including a small pad moistened with appropriate liquid to achieve the desired results.

Accordingly, it is somewhat of a nuisance and handicap to have to maintain, in effect, two sets of eyeglasses and the cases within which the same normally are retained when not in use. Feminine users usually retain the pair of eyeglasses or set of contact lenses and their case in a hand bag when not in use, while masculine users normally have to retain the additional set and case in a pocket which usually adds to the bulkiness of the other items normally contained in a masculine user's pockets.

In addition to normal aesthetic desires for wearing contact lenses in lieu of conventional eyeglasses or spectacles, conventional corrective lenses are sometimes very heavy due to being quite thick and, correspondingly, the frames to hold the same frequently are heavy. As a result, the weight tends to develop sore spots behind the ears and on the bridge of the nose where such frames contact the same. In addition, thick, heavy, lenses are very obvious to persons observing the wearer and under some circumstances cause embarrassment or a feeling of inferiority on the part of the wearer. The substitution of contact lenses for conventional thick and heavy lenses of the type referred to therefore offer more peace of mind and less embarrassment to the wearer, especially during social occasions when the condition of the wearer's lenses of a conventional type are quite obvious.

With respect to contact lenses, in addition to the irritation which many wearers develop after a few hours of use, there is the additional objection that the lenses are sometimes lost or mislaid unless certain conditions of use are observed or care is exercised to prevent loss of the same. Due particularly to the small size of contact lenses and the transparent nature thereof, they are very difficult to observe when they fall upon various types of surfaces.

SUMMARY OF THE INVENTION

It is the principal object of the present invention to provide a conventional eyeglass or spectacle frame having conventional ophthalmic lenses with compartment means at a suitable location upon the frame to retain contact lenses in condition for use when the wearer desires to substitute the same for such conventional eyeglass frame and the normal ophthalmic lenses contained therein.

It is another object of the invention to provide such compartment means in the form of recesses which extend into the body of either the eyeglass frames or the temple bars thereof, at suitable locations, an appropriate cover or closure means also being associated with the recesses to close the same and thereby secure the contact lenses in safe condition within the cavities, preferably under moist conditions.

It is a further object of the invention to arrange the aforementioned compartments or cavities respectively on the side of the conventional eyeglass frame or the temple bar corresponding to the eyes with which the lenses respectively are to be used and thereby very simply designate the left and right lenses in a fool-proof manner.

It is another object of the invention to provide the compartment means within the eyeglass frame or temple bars in such manner that the normal size and shape of the frame and/or temple bars are not unduly increased, whereby the accommodation of the compartment means in the eyeglass frame or temple bars does not render the compartment means objectionably noticable by anyone observing the same.

A still further object of the invention is to provide said compartment means in the form of cavities which readily may be formed by molding incident to the formation of the eyeglass frame or temple bars per se and thereby minimize the cost of production of the same.

Details of the foregoing objects and of the invention, as well as other objects thereof, are set forth in the following specification and illustrated in the accompanying drawings comprising a part of the same.

DESCRIPTION OF THE PREFERRED EMBODIMENTS

Figure 1:
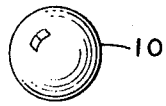
FIG. 1 is a plan view of a conventional contact lens illustrated in about twice normal size.
Figure 2:
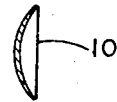
FIG. 2 is a diametrical sectional view of the lens shown in FIG. 1.

Referring to the drawings, an exemplary contact lens is illustrated in FIG. 1 and 2. The average diameter of a contact lens is approximately five-sixteenths of an inch. This dimension is set forth for purposes of illustration rather than restriction however. The curvature of the lens depends upon the prescription of the particular patient for whom the lenses have been designated by a physician. The actual illustration employed in FIGS. 1 and 2 is approximately twice normal size. From this, it can be seen that conventional contact lenses are quite small. Further, considering the fact they are transparent, when they are dropped upon practically any type of surface, they are difficult to see, whereby unusual care normally must be exercised to prevent the dropping of them especially while being handled such as while being placed upon or removed from a human eyeball, as well as during the wearing thereof.

The normal type of case in which a pair of contact lenses are contained is approximately about an inch long and at least three-fourths inch in diameter. Cavities are provided on opposite ends of the case and screw caps enclose the lenses within the cavities in a moist condition. A high percentage of the persons presently wearing contact lenses cannot wear them comfortably for more than a few hours at a time. The human eyeball normally is unreceptive to a foreign object and, when contacted by the same, such as a particle of dirt, eyelash, grain of sand or the like, the normal tendency for the human eye is to flood the eyeball with tears in an effort to flush the foreign object from the eyeball.

When properly fitted with contact lenses, some wearers can tolerate the same indefinitely. However, those wearers who can only accommodate the lenses for a few hours, due to irritation caused by the retention of the contact lenses upon the eyeballs, must remove the lenses for restoration of comfort to the eyes. In order to have suitable vision under such condition, said individuals must resort to the wearing of conventional spectacles or eyeglasses comprising a normal eyeglass frame and conventional ophthalmic lenses. The vast majority of such eyeglasses worn at present include temple bars which either exert pressure upon the opposite sides of the wearer's head to retain the eyeglass frame in position upon the bridge of the nose or engage behind the ears of the wearer to insure that the glasses will not accidentally be dislodged if the wearer should be subjected to a sudden jolt or otherwise.

In view of the foregoing, it has occurred to the present inventor that an eyeglass frame and the temple bars connected thereto are excellent for accommodating compartment means within which contact lenses may be contained while not being worn. This will eliminate the necessity of carrying an extra container within a purse or within wearing apparel for purposes of retaining the contact lenses when not being worn and especially while the eyes are being rested from a previous wearing of the contact lenses.

Figure 3:
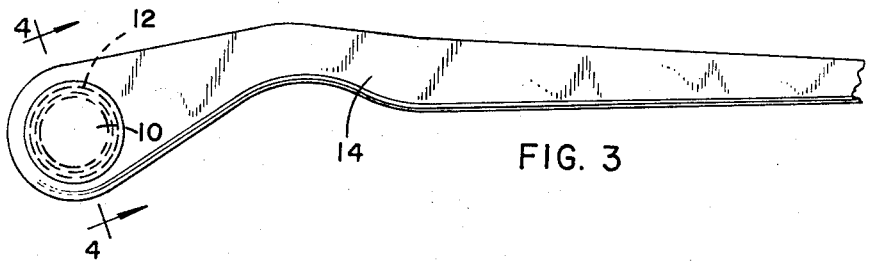
FIG. 3 is a fragmentary, somewhat enlarged view of a conventional temple bar for an eyeglass frame in which one embodiment of compartment means employing the principles of the present invention is shown.
Figure 4:
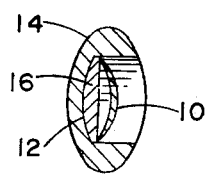
FIG. 4 is a transverse sectional view of a portion of the temple bar shown in FIG. 3, as seen on the line 4—4 thereof with the closure removed.

For convenience, the exemplary contact lens 10 shown in FIGS. 1 and 2 is illustrated in FIGS. 3 and 4 as being contained within one embodiment of cavity 12 which is molded or otherwise formed within the outer portion of the outer end of a temple bar 14. If necessary, the size of a normal temple bar may be increased sufficiently at the outer end thereof to contain the cavity 12. The diameter of the cavity 12 is adequate to readily retain the contact lens 10 therein, as easily can be visualized from FIG. 4. Also, a small pad 16 may be affixed within the bottom of the cavity 12 to contain suitable fluid of the type normally employed in retaining contact lenses moist while being stored.

Figure 5:
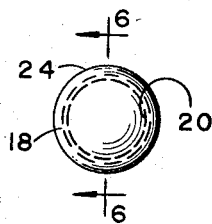
FIG. 5 is a front face view of an exemplary closure for the cavity shown in FIGS. 3 and 4.
Figure 6:
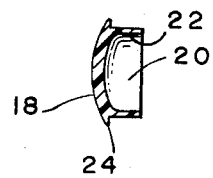
FIG. 6 is a diametrical sectional view of the closure shown in FIG. 5, as seen on the line 6—6 thereof.
Figure 7:
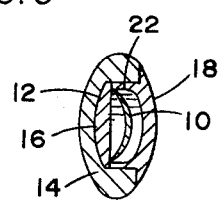
FIG. 7 is a cross-sectional view of FIG. 3 as seen on the line 4—4 of said figure.

Referring to FIGS. 5 and 6, an appropriate closure 18, which preferably has a cavity 20 therein to form a flexible rim 22 thereon, is formed from suitable flexible material such as synthetic rubber or any of a number of different types of pliable synthetic resins or plastics currently available. The flexible rim 22 preferably fits frictionally within the circular walls of the cavity 12 and readily will remain in closed condition with respect to cavity 12 until it is necessary to open the cavity either to insert a lens 10 therein or remove the same therefrom. The outer rim 24 is readily susceptible to having a finger nail engage thereunder to remove the closure from the cavity 12 to gain access thereto, as readily can be visualized from the sectional view of the overall assembly shown in FIG. 7.

Figure 9:
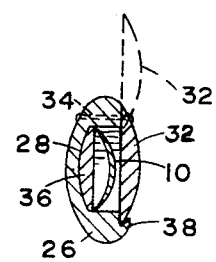
FIG. 9 is a transverse sectional view of a portion of the temple bar and embodiment of compartment means shown in FIG. 8 as seen on the line 9—9 thereof, the closure being shown in open position in phantom and in solid lines in closed position.
Figure 8:
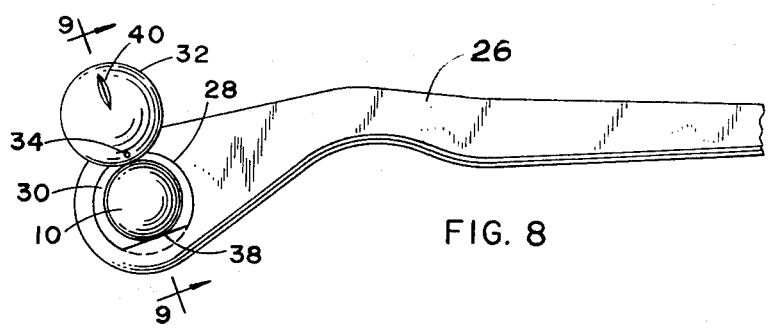
FIG. 8 is a fragmentary side elevation of a portion of a temple bar for a conventional eyeglass frame which includes another embodiment of cavity-type compartment means from that illustrated in the preceding figures, the closure for said means being shown in open position.

Referring to FIG. 8, the temple bar 26 is provided with a preferably circular cavity 28 so as readily to accommodate the contact lens 10. The peripheral surface 30 immediately surrounding cavity 28 is molded, ground, or otherwise prepared so as to be flat for close slidable engagement with at least the peripheral portion of closure 32 which is connected by a pivot pin 34 to the temple bar 26. The cavity 28 also may contain a moistened pad 36 which is similar in shape and function to the pad 16 in the preceding embodiment. To retain the closure 32 secured in closed position, the temple bar 26 is provided with a suitable overhanging lip 38 beneath which the edge of the closure 32 that is opposite the pivoted edge thereof is disposed as can be seen from FIG. 9. If desired, a suitable elongated recess 40 may be provided in the outer surface of closure 32, extending radially from the pivot pin 34, for example, as shown in FIG. 8 to accommodate a finger nail of the user to facilitate pivoting the closure to open position from closed position.

Figures 10, 11:
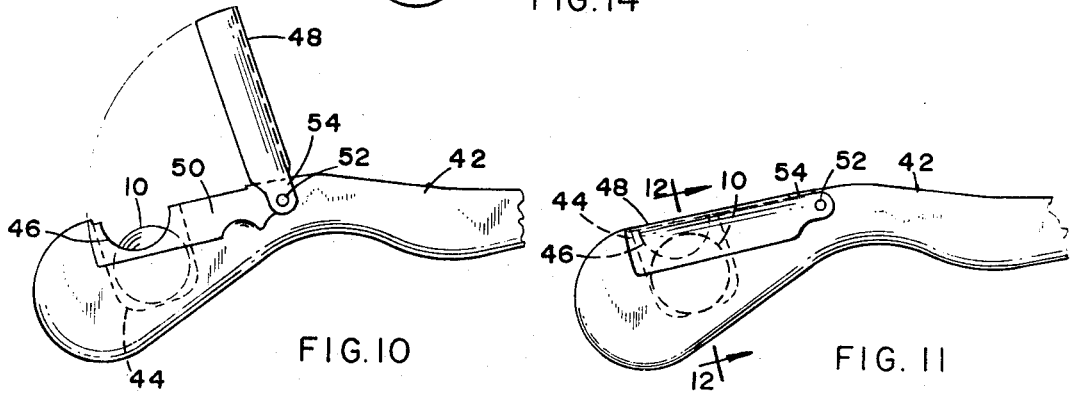
FIG. 10 is a fragmentary view of a portion of a temple bar for a conventional eyeglass frame in which a still further embodiment of compartment means is illustrated which employs the principles of the present invention, the closure for the cavity comprising the compartment being shown in open position of said figure.
FIG. 11 is a view similar to FIG. 10 but showing the closure means in closed position with respect to the compartment.
Figure 12:
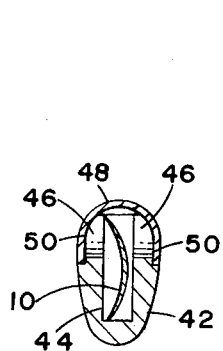
FIG. 12 is a transverse sectional view of the structure shown in FIG. 11 as seen on the line 12—12 thereof.

Referring to FIGS. 10 – 12, it will be seen that a still further embodiment of lens-containing recess is formed in an exemplary temple bar 42. The recess 44 extends inwardly from one edge of the temple bar adjacent the outer rim thereof and the upper edges of the walls defining the recess are provided with notches 46 to facilitate grasping the lens 10 when the closure 48 is moved to open position. Said closure is illustrated in partially open position in FIG. 10, while in FIGS. 11 and 12, it is in completely closed position. In cross-section, the closure 48 is U-shaped, as can be seen from FIG. 12.

To accommodate the sides of the closure, the opposite side surfaces of the temple bar 42, adjacent the cavity 48, respectively are provided with flat recesses 50, whereby the outer surfaces of the side walls of closure 48 are smoothly within the same planes as the outer surfaces of the temple bar 42. Preferably, the closure 48 is pivoted by a pin 52 which extends through a pair of ears 54 respectively formed on each of the sides of the U-shaped closure 48. A friction fit of the sides of the closure 48 with the flat walls of the recesses 50 is adequate to retain the closure in position to enclose the lenses 10 within the recesses 44, but latching detent and dimple means, not shown, may be used, if desired. Also, suitable pad means, not shown, may be enclosed within the cavities 44 to retain the lenses in moist condition.

Figure 13:
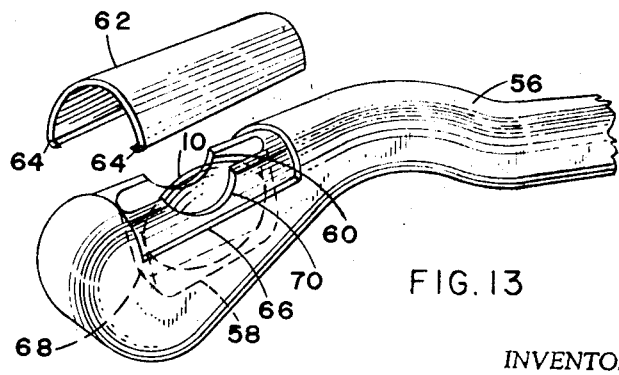
FIG. 13 is a fragmentary perspective view of still another embodiment of compartment means formed in the outer end of a temple bar for a conventional eyeglass frame, the cover for the compartment means being illustrated in open position and of the type adapted to be snapped into engagement with the temple bar.

In FIG. 13, a slightly different embodiment of compartment means from that shown in FIGS. 10–12 is illustrated within the outer end of another exemplary, fragmentary showing of a temple bar 56. The recess 58 shown therein is similar to recess 44 in the preceding embodiment and the side walls defining the same, in the upper edges thereof also are provided with notches 60 to facilitate engaging one edge of the lens 10 to remove the same from the recess. In this embodiment, the closure 62 is U-shaped in cross-section as readily can be seen in said figure and the terminal, longitudinal edges 64 of the sides of the closure are bent inwardly for reception within shallow longitudinal grooves 66 which are formed in opposite sides of the temple bar 56.

A curved, shallow recess 68 preferably is provided within the upper edge and portions of the adjacent side edges of the temple bar 56 to receive the closure 62 in such manner that the outer surfaces of the latter are flush with what would otherwise be the outer surfaces of the temple bar 56 if said recess and closure were not used. Also, adjacent one of the grooves 66, intermediately of the ends thereof, for example, is a notch 70 to accommodate a thumb or finger nail to assist in springing one side of the closure 62 away from the temple bar and thus facilitating removal of the closure from said temple bar to gain access to the lens 10.

The closure 48 in the embodiment of FIGS. 10 – 12 and the closure 62 in the embodiment of FIG. 13 may be formed of any suitable material such as resilient metal, preferably of a corrosion resistant type. If desired, particularly if the temple bars 42 are formed from aluminum and suitably colored by being anodized, the closures 48 and 62 likewise may be appropriately colored so as to render the closures inconspicuous. Otherwise, if the closures are formed from some other type of resilient metal, the same preferably may be lacquered or coated with baked enamel, or otherwise coated, to render the same as inconspicuous as possible with respect to the color of the temple bars. Certain forms of plastic or synthetic resin likewise are suitable for forming the closures 48 and 62 in said embodiment within the contemplation of the present invention.

Figure 14:
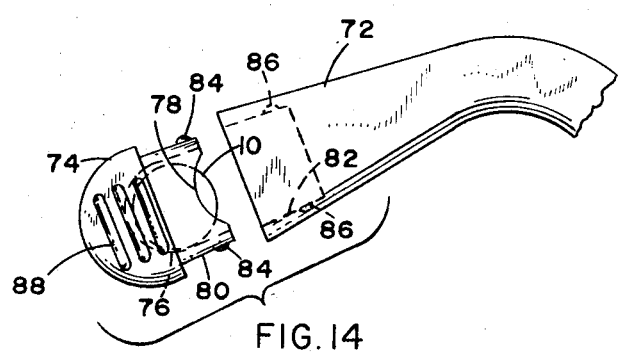
FIG. 14 is a still further embodiment of compartment means formed in the outer end of an exemplary, fragmentarily illustrated outer end of a temple bar, shown in exploded manner.

Referring to FIG. 14, a still further embodiment of compartment means is formed in temple bar 72 which, as in the preceding embodiments, is illustrated in fragmentary manner. In this embodiment, a compartment member 74 may be suitably molded from synthetic resin, plastics, or appropriate metal and is suitably finished relative the finish of temple bar 72 in a manner to render the closure member harmonious with the temple bar. The compartment member is formed with a relatively thin recess or cavity 76 which extends inwardly from one end thereof and the walls defining the same adjacent said ends are provided with notches 78 to facilitate engagement of the lens 10 which is contained within the cavity 76. The end portion of the compartment member 78 which contains the cavity 76 is reduced along its side and edge walls so as to somewhat resemble a tongue 80 which is complementary to a recess 82 which extends inward from the outer end of temple bar 72 for close engagement between the adjacent walls of the tongue 80 and recess 82.

To prevent accidental removal of the compartment member 74 from the temple bar 72, the tongue 80 also may be provided with one or more small detents 84 which may be received within complementary dimples 86 formed within the recess 82. Preferably, the material from which the compartment member 74 is formed has at least limited yieldability to facilitate the coengagement between the detents 84 and dimples 86. Also, to facilitate the connection of compartment member 74 with the temple bar 72, and removal of the same therefrom, the compartment member 74 may be provided with a suitable pattern of serrations or ribs 88 on one or both side surfaces thereof.

Figure 15:
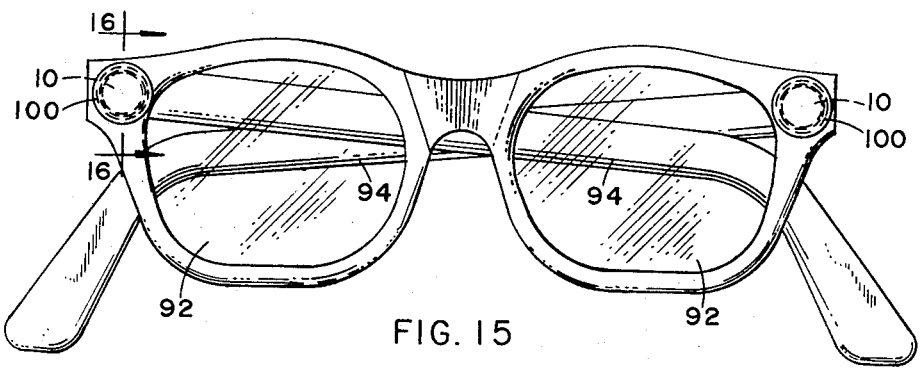
FIG. 15 is a front elevation of a conventional eyeglass frame having temple bars connected thereto and showing portions of the eyeglass frame per se provided with compartment means to contain a set of contact lenses in accordance with the principles of the invention.
Figure 16:
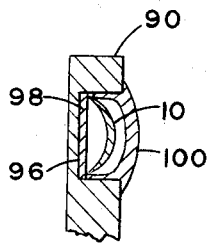
FIG. 16 is a fragmentary sectional view of a portion of FIG. 15 as seen on the line 16—16 thereof.

In FIG. 15, an exemplary eyeglass frame 90 is illustrated which may be formed from conventional materials such as those employed at present. Various types of synthetic resins or plastics, and metals are used. Especially when resins or plastics are employed, the frame 90 is formed by suitable molding. The frame is provided with conventional rims defining apertures 92 within which normal ophthalmic lenses are mounted by normal techniques. Temple bars 94 normally are hingedly connected to the opposite sides of the frame 90 adjacent the upper, outer corners thereof. As illustrated in FIG. 15, it also will be seen that said upper, outer corners of the frame 90 are a highly suitable location for the provision of cavities 96 as best seen in FIG. 16. If desired, said cavity may contain a pad 98 which may be moistened to retain the lens 10 in each cavity in moist condition.

Each cavity 96 is closed by a suitable closure 100 which, for example, may be similar to the closure 18 shown in the embodiment illustrated in FIGS. 3 – 7 and formed from material similar to closure 18, as described above. Further, it is quite common at present to ornament the exterior surfaces of eyeglass frames, especially along the upper rim thereof and at the corners where the hinges are connected to the frame. Accordingly, the outer surfaces of the closures 100 may be suitably molded or otherwise finished so as to be of an ornamental nature either due to the contour of the outer surface thereof or the coloring, or otherwise.

From the foregoing, it will be seen that eyeglass frames are highly suitable means to accommodate compartment means such as cavities, within which contact lenses may be contained or stored when not in use. Further, in the various embodiments described hereinabove, it will be seen that the pair of compartments which are provided either in the temple bars or the eyeglass frame per se, respectively are adjacent opposite sides of the human head when in use.

Accordingly, said sides comprise a fool-proof indication of the contact lenses when the same are to be placed upon the eyeballs of the wearer, without requiring further identification as is now necessary with respect to the caps provided on conventional cases or holders now furnished with contact lenses. There is a possibility of the caps of such a holder becoming mixed, whereas by using the compartment means according to the present invention, at least no such mixing of the identifying means is possible. It is of course possible to deposit the wrong lens in the compartments of the temple bars and eyeglass frame in accordance with the invention and there is no known way of preventing this unless some suitable indicia or identifying mark is placed directly upon the contact lenses.

Further, in the event it is found that a greater degree of moist atmosphere is required, or if actual liquid is required, at least by certain users, than that which would be possible with the described cavities and moistening pads contained therein, or for other possible reasons, said cavities may, if desired, be made of a sufficient size to receive a small box or container of appropriate diameter and depth to receive a lens and have a telescoping cover thereon within which the lenses may be disposed in a suitable manner. Such a container preferably need be only very slightly larger than the diameter and depth of the lenses contained therein, whereby the cavities within the temple bars and/or eyeglass frame, as described above, need be only slightly larger than under circumstances where the lenses per se were disposed therein, whereby it is contemplated that such additional containers might be employed in conjunction with the cavity means described and illustrated herein.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. An eyeglass frame unit including a pair of rims connected together and adapted to support conventional ophthalmic lenses and temple bars connected to said rims, said frame unit being provided with similar cavities at similar locations at opposite sides of said unit and each cavity having a depth adequate to fully receive a contact lens and contain fluid to retain said lenses in pliable condition, and cover means adapted to close said cavities to conceal lenses and retain fluid therein without appreciable loss of fluid regardless of the position in which said eyeglass frame unit is disposed by the wearer.

2. The frame unit according to claim 1 in which said cover means are hingedly connected to said unit respectively adjacent said cavities.

3. The frame unit according to claim 1 in which said cover means and the walls defining said cavities have slidably interfitting portions affording telescoping type connecting and disconnecting movements.

4. The frame unit according to claim 1 in which said cavities also include moisture absorbing pads to enhance the retention of moisture within said cavities.

5. The frame unit according to claim 1 in which said cavities are formed in said rims of said unit.

6. The frame unit according to claim 1 in which said cavities are formed in said temple bars.

7. The frame unit according to claim 6 in which said cavities are formed in the outer ends of said temple bars.

* * * * *